United States Patent
Bae et al.

(10) Patent No.: US 11,289,233 B2
(45) Date of Patent: Mar. 29, 2022

(54) METHOD FOR COLLECTING URANIUM BY TREATMENT PROCESS OF WASHING WASTE LIQUID GENERATED IN URANIUM HEXAFLUORIDE CYLINDER WASHING PROCESS

(71) Applicants: Youngmoon Bae, Daejeon (KR); Hyundong Shin, Daejeon (KR); Seungchul Yang, Daejeon (KR); Bohyun Jo, Daejeon (KR); Byungkuk Lee, Daejeon (KR); Dongyong Kwak, Daejeon (KR); Hyunkwang Cho, Daejeon (KR); Sunghoi Gu, Daejeon (KR); Euijun Hwang, Daejeon (KR)

(72) Inventors: Youngmoon Bae, Daejeon (KR); Hyundong Shin, Daejeon (KR); Seungchul Yang, Daejeon (KR); Bohyun Jo, Daejeon (KR); Byungkuk Lee, Daejeon (KR); Dongyong Kwak, Daejeon (KR); Hyunkwang Cho, Daejeon (KR); Sunghoi Gu, Daejeon (KR); Euijun Hwang, Daejeon (KR)

(73) Assignee: Kepco Nuclear Fuel Co., Ltd., Daejeon (KR)

( * ) Notice: Subject to any disclaimer, the term of this patent is extended or adjusted under 35 U.S.C. 154(b) by 712 days.

(21) Appl. No.: 16/171,641

(22) Filed: Oct. 26, 2018

(65) Prior Publication Data
US 2019/0139663 A1 May 9, 2019

Related U.S. Application Data

(63) Continuation of application No. PCT/KR2016/013505, filed on Nov. 23, 2016.

(30) Foreign Application Priority Data

Apr. 28, 2016 (KR) .......................... 10-2016-0052523

(51) Int. Cl.
*G21F 9/08* (2006.01)
*B01D 35/02* (2006.01)
(Continued)

(52) U.S. Cl.
CPC ............... *G21F 9/08* (2013.01); *B01D 35/02* (2013.01); *C02F 1/04* (2013.01); *C02F 1/52* (2013.01);
(Continued)

(58) Field of Classification Search
CPC ....................................................... G21F 9/08
See application file for complete search history.

(56) References Cited

U.S. PATENT DOCUMENTS

| 2004/0104107 | A1 | 6/2004 | Mizutani et al. | |
| 2016/0122199 | A1* | 5/2016 | Noe | C01G 43/01 423/16 |
| 2016/0159674 | A1* | 6/2016 | Allen | C02F 9/00 210/736 |

FOREIGN PATENT DOCUMENTS

| EP | 2808409 A1 | 12/2014 |
| JP | 62-235218 A | 10/1987 |

(Continued)

OTHER PUBLICATIONS

Subhankar Manna et al.; Study of crystal growth and effect of temperature and mixing on properties of sodium diuranate; Progress in Nuclear Energy 91 (2016) 132-139.
(Continued)

*Primary Examiner* — Peter Keyworth
(74) *Attorney, Agent, or Firm* — Reinhart Boerner Van Deuren P.C.

(57) ABSTRACT

Disclosed are a method and a device for recovering uranium (U) using a process for chemically treating washing wastewater of a uranium hexafluoride (UF6) cylinder. The method
(Continued)

and the device are provided to separate uranium (U) from the wastewater released during a process of washing the uranium hexafluoride (UF6) cylinder and to release a filtrate that satisfies atomic energy licensing standards and environmental regulation standards using evaporation and condensation. Accordingly, an independent technology and process for treating the wastewater released during the process of washing the uranium hexafluoride (UF6) cylinder are ensured, which provides easier maintenance and greatly reduces costs compared to the purchase and operation of apparatuses manufactured by foreign makers.

5 Claims, 6 Drawing Sheets

(51) Int. Cl.
*G01T 1/167* (2006.01)
*G21F 9/10* (2006.01)
*C02F 1/58* (2006.01)
*C22B 60/02* (2006.01)
*C02F 9/00* (2006.01)
*C02F 1/04* (2006.01)
*C02F 1/52* (2006.01)
*G21F 9/12* (2006.01)

(52) U.S. Cl.
CPC ............... *C02F 1/58* (2013.01); *C02F 9/00* (2013.01); *C22B 60/02* (2013.01); *C22B 60/0252* (2013.01); *G01T 1/167* (2013.01); *G21F 9/10* (2013.01); *G21F 9/12* (2013.01); *Y02P 10/20* (2015.11)

(56) References Cited

FOREIGN PATENT DOCUMENTS

| JP | 9-113681 A | 5/1997 |
| KR | 10-1984-0002354 B1 | 12/1984 |
| KR | 10-2004-0083462 A | 10/2004 |
| KR | 10-2009-0112862 A | 10/2009 |

OTHER PUBLICATIONS

Austin Dean Meredith; Modified Sodium Diuranate Process for the recovery of Uranium from Uranium Hexafluoride Transport Cylinder Wash Solution; University of South Carolina, Scholar Commons, Theses and Dissertation, Dec. 16, 2013.

* cited by examiner

METHOD FOR COLLECTING URANIUM BY TREATMENT PROCESS OF WASHING WASTE LIQUID GENERATED IN URANIUM HEXAFLUORIDE CYLINDER WASHING PROCESS

CROSS-REFERENCE TO RELATED PATENT APPLICATIONS

This patent application is a continuation of PCT Application No PCT/KR2016/013505, filed Nov. 23, 2016, which claims priority to Korean Patent Application No. 10-2016-0052523, filed Apr. 28, 2016, the entire teachings and disclosure of which are incorporated herein by reference thereto.

TECHNICAL FIELD

The present invention relates to a method and a device for recovering uranium using a process for chemically treating washing wastewater from a uranium hexafluoride ($UF_6$) cylinder. More particularly, the present invention relates to a method and a device that precipitate sodium diuranate (NaDU) and sodium fluoride (NaF) solids from washing wastewater from a uranium hexafluoride ($UF_6$) cylinder to recover uranium (U), which is a radioactive element, and fluorine (F), which is a toxic element, and that releases a filtrate satisfying atomic energy licensing standards and environmental regulation standards, thereby minimizing the amount of waste that is released.

BACKGROUND ART

Cylinder washing wastewater, which is a reactant used in the present invention, is released during the following process.

Demineralized water is used as washing water, a mixed solution including 10% hydrogen peroxide ($H_2O_2$) and 90% sodium carbonate ($Na_2CO_3$) is used as a washing solution, and a 30B-type cylinder used in Korea is generally washed five times per cylinder in a way that the cylinder is washed twice using washing water and three times using the washing solution shown in Table 1. The wastewater is released in an amount of 20 Liters for each washing, and the total amount of wastewater that is released is about 100 Liters. The wastewater is radioactive waste matter that is inevitably released during the production of atomic energy fuel, and it is an object of the present invention to treat the radioactive waste matter using an effective method, thereby minimizing the amount of such radioactive waste matter.

ammonium diuranate (ADU) and a process of precipitating sodium diuranate (NaDU), and most processes suggested by foreign makers include a sodium diuranate (NaDU) process. This is because, during the sodium diuranate (NaDU) process, sodium hydroxide (NaOH), which is easily handled, is used, the amounts of uranium (U) and fluorine (F) easily satisfy regulation values, and the radioactive waste matter is released in a small amount.

Figure 1A:
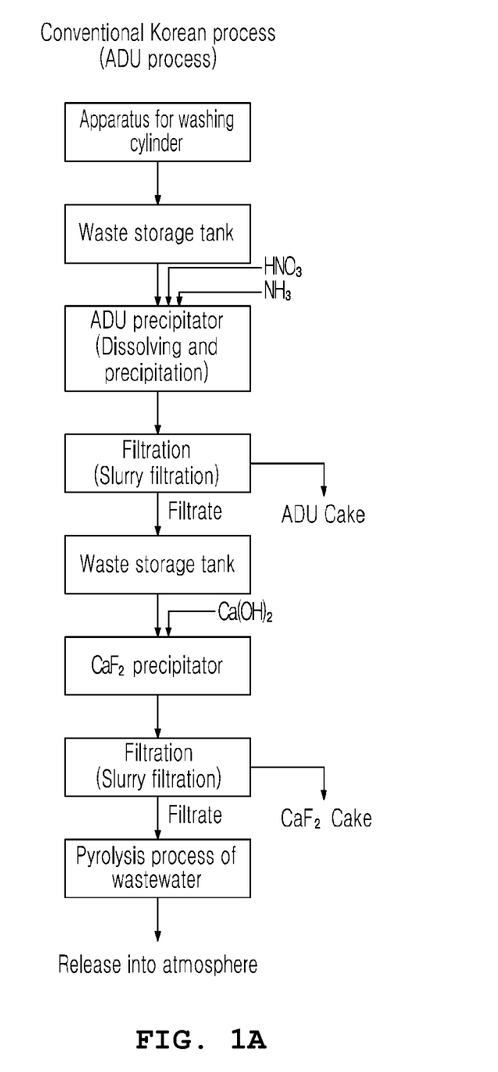
FIG. 1a showing a conventional process of precipitating ammonium diuranate (ADU)

In Korea, wastewater has been treated using the conventional ADU process (FIG. 1a). However, since the process does not satisfy atomic energy licensing standards and environmental regulation standards, secondary wastewater released during the ADU precipitation process is treated using pyrolysis to satisfy the atomic energy licensing standards and environmental regulation standards, and is then released to the atmosphere. However, the pyrolysis process has significant drawbacks in that the number of process control factors is large and maintenance costs are high. Accordingly, a novel process needs to be developed so that wastewater can be directly released to the environment without the pyrolysis process.

Figure 1B:
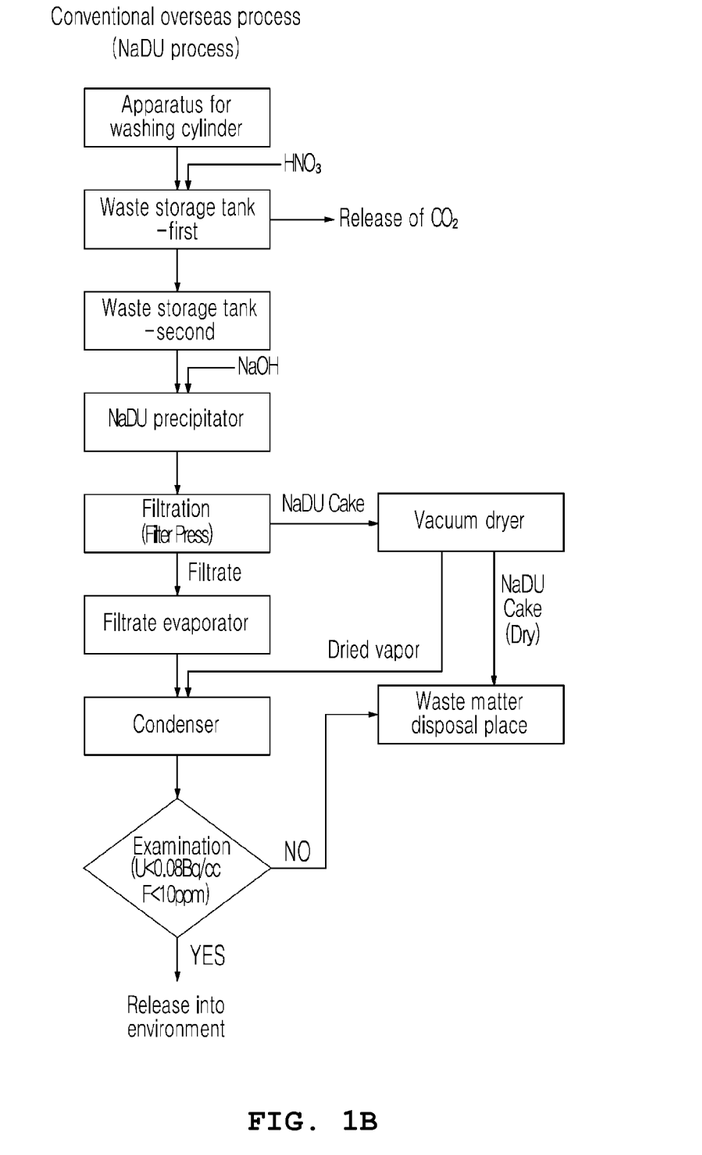
FIG. 1b showing a conventional process of precipitating sodium diuranate (NaDU)

In overseas processes, a process for treating the washing wastewater of the uranium ($UF_6$) cylinder using NaDU precipitation (FIG. 1b) has been used, and details of the process are as follows. Nitric acid ($HNO_3$) is injected into the wastewater [demineralized water and hydrogen peroxide ($H_2O_2$)+sodium carbonate ($Na_2CO_3$)], which is collected in a first storage tank (column tank) to dissolve impurities, and the solution is then recycled and heated to remove $CO_2$ and perform uniform mixing. The resultant mixture is transported to a second storage tank (decay tank). After the radioactivity of the transported wastewater decreases in the storage tank (decay tank), the wastewater is transported to a precipitator in order to perform the process of precipitating sodium diuranate (NaDU). About 33 wt % of a sodium hydroxide (NaOH) aqueous solution is slowly injected into the wastewater, which is transported to the precipitator and is agitated using an agitator at a temperature of 40 to 60° C. under a condition of a pH of 9 to 11. Uranium contained in the wastewater is precipitated in a sodium diuranate (NaDU) form, and the concentration of uranium (U) in the supernatant is 100 ppm or less. Subsequently, the supernatant is evaporated in an evaporator, and the precipitate is obtained by filtration in a filter press. Most of the wastewater is evaporated during an evaporation process, and the moisture content of the remaining sludge is about 30%. The sludge is heated to 55° C. in a vacuum to be dried so that the moisture content is 1% or less. Subsequently, the dried sludge is discarded while contained in a drum. The released moisture

TABLE 1

Details of the process of washing the cylinder

| Wash Number | Washing solution | Addition amount | Washing time and cylinder angle | | |
|---|---|---|---|---|---|
| 1 | Demi-Water | 20 Liters | 15 min/90° | 15 min/69° | 15 min/90° |
| 2 | $Na_2CO_3/H_2O_2$ | 20 Liters | 15 min/90° | 15 min/69° | 15 min/90° |
| 3 | $Na_2CO_3/H_2O_2$ | 20 Liters | 15 min/90° | 15 min/69° | 15 min/90° |
| 4 | Demi-Water or $Na_2CO_3/H_2O_2$ | 20 Liters | 15 min/90° | 15 min/69° | 15 min/90° |
| 5 | Demi-Water | 20 Liters | 15 min/90° | 15 min/69° | 15 min/90° |
| Total (washing of one cylinder) | | 100 Liters | Total 3.75 hr | | |

A conventional process for chemically treating cylinder washing wastewater includes a process of precipitating is collected in a condensate storage tank through a condenser. When the condensate storage tank is fully filled, sampling and measurement are performed, and the condensed water is released if a release condition is satisfied. The release condition is that the concentration of the alpha radioactivity is 1 ppm or less on average, that is, 100 kBq/m³ or less.

Figure 1C:
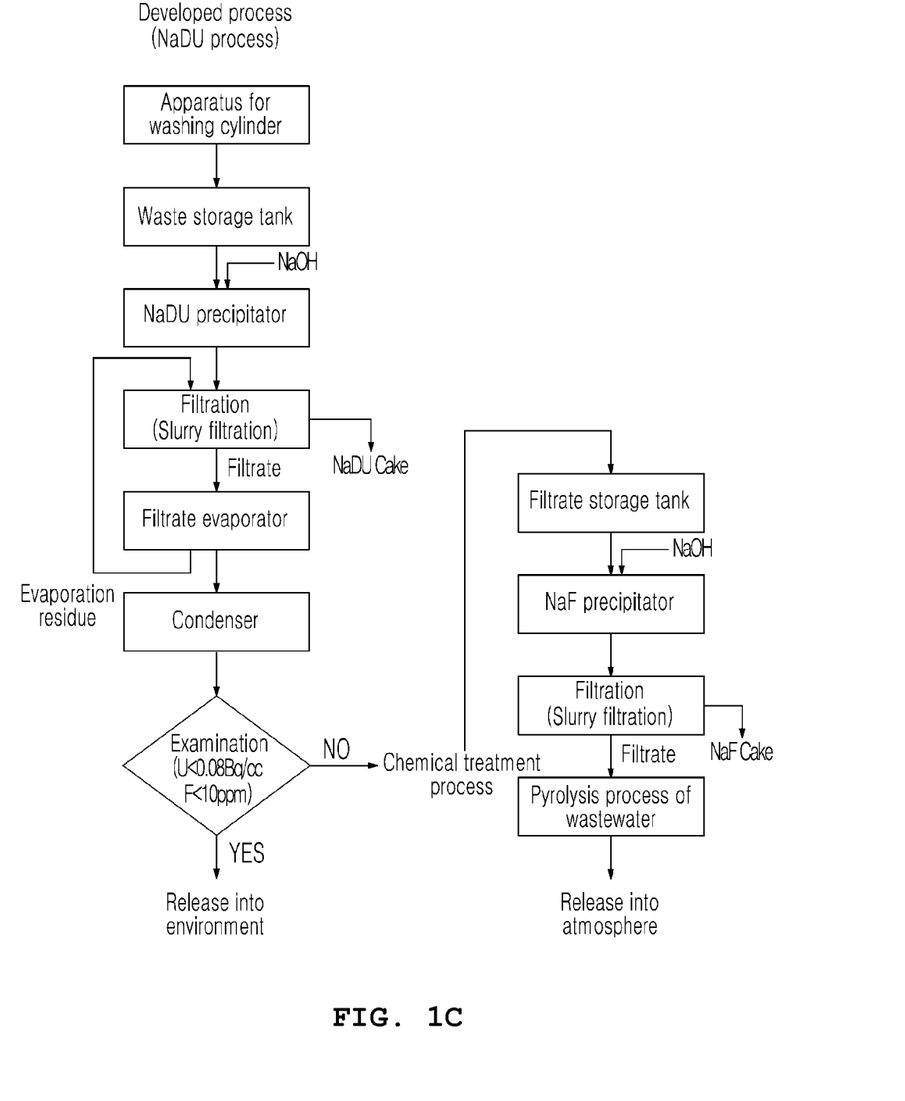
FIG. 1c showing a process of precipitating sodium diuranate (NaDU) according to the present invention.

The present inventors have developed a process including [sodium diuranate (NaDU) precipitation→evaporation→condensation] (FIG. 1c) using an independent apparatus in order to solve the problem whereby the conventional ADU process does not satisfy atomic energy licensing standards and environmental regulation standards and to simplify the conventional Korean process (ADU) and the overseas process (NaDU), thereby accomplishing the present invention.

Korean Patent Application Publication No. 10-2009-0112862 (Laid-open date: Oct. 29, 2009) describes aspects of the foregoing discussion.

BRIEF SUMMARY

Accordingly, the present invention has been made keeping in mind the above problems occurring in the related art, and an object of the present invention is to provide (1) a method of separating uranium (U) from wastewater released during a process of washing a uranium hexafluoride ($UF_6$) cylinder and of releasing a filtrate satisfying atomic energy licensing standards and environmental regulation standards; and (2) a device for controlling the pH of the washing wastewater of the cylinder using sodium hydroxide (NaOH) to separate uranium (U) via precipitation in a sodium diuranate (NaDU) form and then evaporating the filtrate so that uranium (U) remaining in the filtrate is further separated and moisture is condensed for release.

In order to accomplish the above object, the present invention provides a method of recovering uranium using a process for chemically treating washing wastewater (hydrogen peroxide ($H_2O_2$)+sodium carbonate ($Na_2CO_3$)+a uranium complex) released during a process of washing a uranium hexafluoride ($UF_6$) cylinder. The method includes (1) adding sodium hydroxide (NaOH) to the washing wastewater to precipitate the uranium complex, contained in the washing wastewater, in a sodium diuranate (NaDU) solid form, (2) separating a sodium diuranate (NaDU) precipitate, formed during the step (1), from the wastewater using filtration, (3) evaporating the wastewater filtered during the step (2), (4) filtering the wastewater remaining after the evaporating of the step (3), (5) evaporating the wastewater filtered during the step (4), and (6) cooling a vapor generated during the steps (3) and (5) to recover a condensate and then checking the amounts of uranium (U) and fluorine (F) that remain.

Demineralized water or a mixed solution including the hydrogen peroxide ($H_2O_2$) and the sodium carbonate ($Na_2CO_3$) is used as a washing solution during the process of washing the uranium hexafluoride ($UF_6$) cylinder, resulting in the generation of washing wastewater.

A sodium hydroxide (NaOH) aqueous solution is added while the washing wastewater is heated to a predetermined temperature during the step (1), thereby precipitating uranium from the wastewater in a sodium diuranate (NaDU) form.

Steam is supplied to an evaporator to evaporate the wastewater during the steps (3) and (5).

The present invention also provides a device for recovering uranium using a process for chemically treating washing wastewater of a uranium hexafluoride ($UF_6$) cylinder. The device includes a NaDU reactor 1 for adding sodium hydroxide (NaOH) to the washing wastewater (hydrogen peroxide ($H_2O_2$)+sodium carbonate ($Na_2CO_3$)+a uranium complex), released during the process of washing the uranium hexafluoride ($UF_6$) cylinder, to thus precipitate uranium from the wastewater in a sodium diuranate (NaDU) form, a filter separator 2 connected to the NaDU reactor 1 to separate a sodium diuranate (NaDU) precipitate generated in the NaDU reactor 1 and a filtrate, a filtrate reception tank 3 connected to the filter separator 2 to store the filtrate separated using the filter separator 2, an evaporator 4 connected to the filtrate reception tank 3 to evaporate the filtrate supplied from the filtrate reception tank 3, a heat exchanger 5 connected to the evaporator 4 to cool vapor obtained during evaporation using the evaporator 4, thus condensing the vapor, and a condensate storage tank 6 connected to the heat exchanger 5 to store a condensate.

Another filter separator 2' is connected to the evaporator 4 to filter the wastewater remaining after sodium diuranate (NaDU) is evaporated, thereby separating the precipitate and the filtrate.

The condensate storage tank 6 includes a first condensate storage tank 6-1, for storing the condensate to be released after the amounts of uranium (U) and fluorine (F) are checked, and a second condensate storage tank 6-2, for storing the condensate that is to be chemically treated.

Provided are a method and a device that separate uranium (U) from wastewater released during a process of washing a uranium hexafluoride ($UF_6$) cylinder using precipitation and that release a filtrate satisfying atomic energy licensing standards and environmental regulation standards using evaporation and condensing. Accordingly, an independent technology and process for treating the washing wastewater of the uranium hexafluoride ($UF_6$) cylinder are ensured, thus improving maintenance and processability, contributing to ensuring source technologies, improving the technical skill of the national atomic energy industry, and creating a new industrial growth engine using overseas business connections.

Further, costs may be significantly reduced compared to the purchase and operation of process technologies and apparatuses provided by foreign makers.

DETAILED DESCRIPTION

Hereinafter, the present invention will be described in detail.

The present invention provides a method of recovering uranium (U) using a process for treating washing wastewater (hydrogen peroxide ($H_2O_2$)+sodium carbonate ($Na_2CO_3$)+a uranium complex) released during a process of washing a uranium hexafluoride ($UF_6$) cylinder. The method includes (1) adding sodium hydroxide (NaOH) to the washing wastewater to precipitate the uranium complex, contained in the washing wastewater, in a sodium diuranate (NaDU) form, (2) separating a sodium diuranate (NaDU) precipitate formed during the step (1) and the washing wastewater using filtration, (3) evaporating the washing wastewater filtered during the step (2), and (4) cooling vapor generated during the step (3) to recover a condensate and then checking the remaining amounts of uranium (U) and fluorine (F).

Meanwhile, as for the process of washing the uranium hexafluoride ($UF_6$) cylinder, conventionally, a separate chemical treatment process [the process of precipitating sodium fluoride (NaF)→the wastewater pyrolysis process] must be performed after the precipitation reaction of sodium diuranate (NaDU) using an ADU process in order to satisfy atomic energy licensing standards and environmental regulation standards. A process suggested by foreign makers necessarily includes injecting a nitric acid ($HNO_3$) into a first wastewater storage tank (column tank) to thus remove impurities. However, the present invention requires neither a separate process for chemically treating the washing wastewater released during the process of washing the uranium hexafluoride ($UF_6$) cylinder nor a process for injecting nitric acid ($HNO_3$) into the washing wastewater, but treats the washing wastewater using an independent apparatus.

The method of recovering uranium according to the present invention may include, after the step (3), (5) filtering and evaporating the wastewater remaining after the evaporating of the step (3), and (6) heat-exchanging the vapor generated during the step (5) to recover a condensate and then checking the amounts of uranium (U) and fluorine (F) that remain.

A demineralized water or a mixed solution, including hydrogen peroxide ($H_2O_2$) and sodium carbonate ($Na_2CO_3$), is used as a washing solution during the process of washing the uranium hexafluoride ($UF_6$) cylinder, causing generation of the washing wastewater. When the mixed solution including hydrogen peroxide ($H_2O_2$) and sodium carbonate ($Na_2CO_3$) is used, it is preferable that 10 wt % of hydrogen peroxide ($H_2O_2$) and 90 wt % of sodium carbonate ($Na_2CO_3$) be mixed.

During the evaporation of the filtered washing wastewater, steam is supplied to evaporate water, the evaporated water is transported through a heat exchanger to a condensate storage tank, and a residue is recycled to filter the remaining sodium diuranate (NaDU) solid and washing wastewater and then evaporate the filtered washing wastewater. This procedure may be repeated.

Preferably, the demineralized water and the mixed solution including hydrogen peroxide ($H_2O_2$) and sodium carbonate ($Na_2CO_3$) are used during washing of the cylinder to convert remaining tetravalent uranium ($U^{4+}$: insoluble) into hexavalent uranium ($U^{6+}$: water-soluble). The washing wastewater of the cylinder includes a 0.1 to 3.0M uranyl nitrate aqueous solution [$UO_2(NO_3)_2 \cdot 6H_2O$], and about 90% of the washing wastewater is water. The concentration of uranium (U) is 1.0 kg-$UF_6$/100 l, and a 30B type is used as the cylinder.

Further, the method may include a step of preparing for washing and a washing step. The heel of the inside of the uranium hexafluoride ($UF_6$) cylinder used during the process of washing the cylinder is 3 kg or less, and a radiation dose rate is 50 μ/hr or less at a position that is 10 cm above the external surface of the cylinder. During the washing step, a nozzle is inserted into the cylinder and washing water (20 L of demineralized water or 20 L of a mixed washing solution including hydrogen peroxide ($H_2O_2$) and sodium carbonate ($Na_2CO_3$)) is sprayed through the nozzle (the cylinder is washed while being vertically disposed at 90° C., 69° C., and 90° C. sequentially, and is washed using the demineralized water once, the washing solution twice, and the demineralized water twice, and if necessary, washing is performed two more times using the aqueous solution including hydrogen peroxide ($H_2O_2$) and sodium carbonate ($Na_2CO_3$)).

Further, the present invention provides a device for recovering uranium using a process for treating the washing wastewater that is released during a process of washing a $UF_6$ cylinder. The device includes a NaDU reactor 1 for adding sodium hydroxide (NaOH) to the washing wastewater (hydrogen peroxide ($H_2O_2$)+sodium carbonate ($Na_2CO_3$)+a uranium complex), released during the process of washing the uranium hexafluoride ($UF_6$) cylinder, to thus precipitate a sodium diuranate (NaDU) solid, a filter separator 2 connected to the NaDU reactor 1 to separate the sodium diuranate (NaDU) solid generated in the NaDU reactor 1 and a filtrate, a filtrate reception tank 3 connected to the filter separator 2 to store the filtrate separated using the filter separator 2, an evaporation vessel 4 connected to the filtrate reception tank 3 to evaporate the filtrate supplied from the filtrate reception tank 3, a filter separator 2' for filtering the wastewater remaining after evaporation to recycle the filtered wastewater to the evaporation vessel 4, a heat exchanger 5 connected to the evaporation vessel 4 to cool vapor obtained during evaporation using the evaporation vessel 4, thus condensing the vapor, and a condensate storage tank 6 connected to the heat exchanger 5 to store condensate.

The filter separator 2' may be connected to the evaporation vessel 4 to separate the sodium diuranate (NaDU) solid and the filtrate, thereby achieving two-stage filtration using the two filter separators.

The condensate storage tank 6 may include a first condensate storage tank 6-1, for storing the condensate to be released after the amounts of uranium (U) and fluorine (F) are checked, and a second condensate storage tank 6-2, for storing the condensate that is to be chemically treated.

Figure 2:
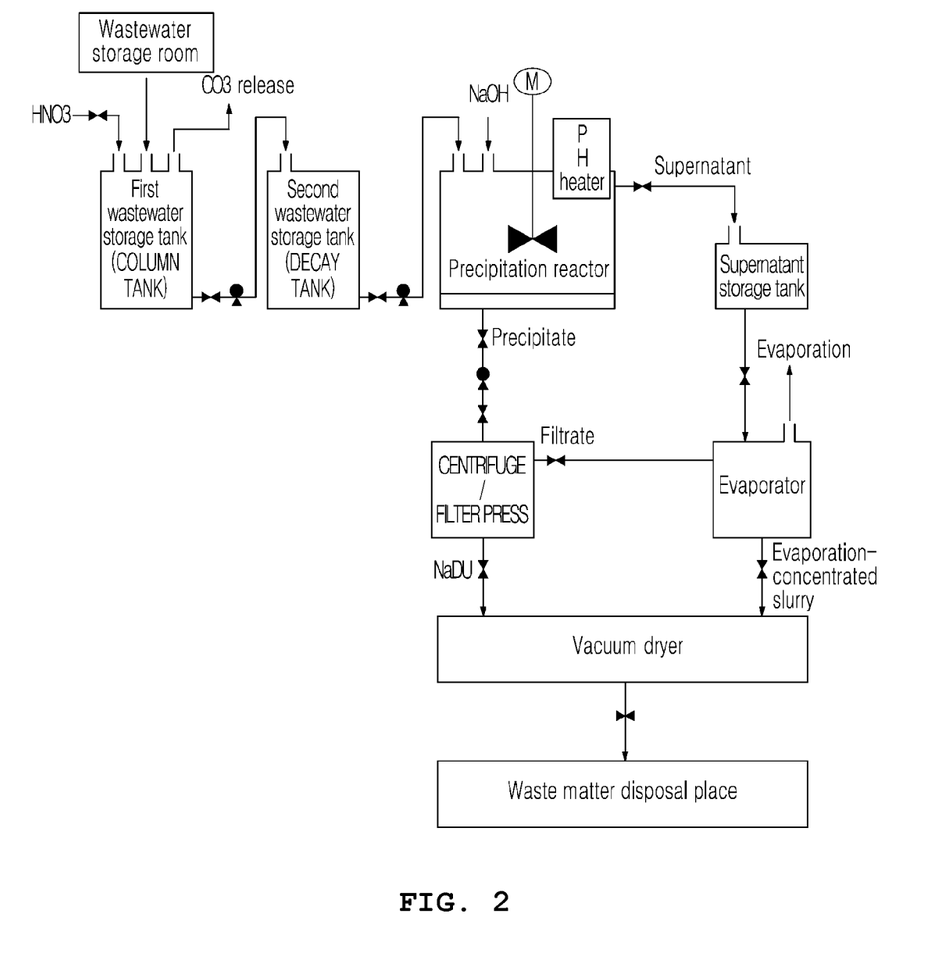
FIG. 2 shows a device for recovering uranium (U) using a process for treating washing wastewater released during a process of washing a uranium hexafluoride ($UF_6$) cylinder in the related art (foreign process)
Figure 3:
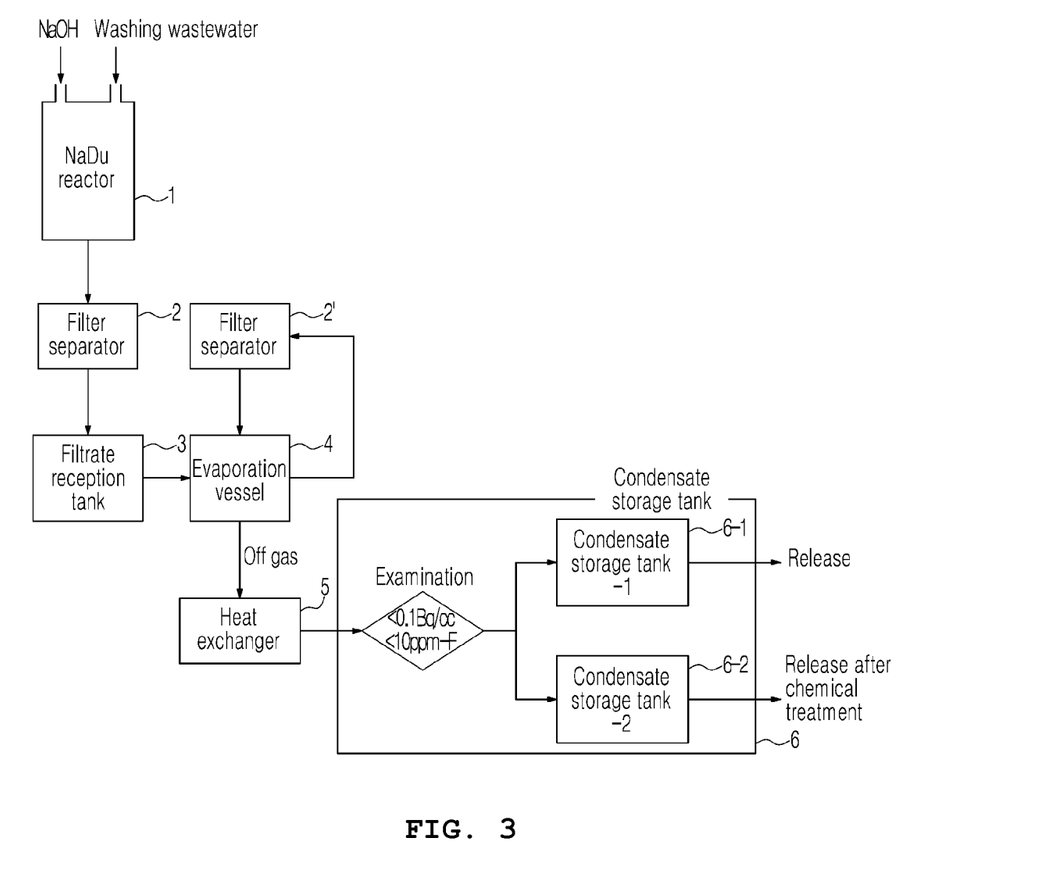
FIG. 3 shows a device for recovering uranium (U) using a process for treating washing wastewater released during a process of washing a uranium hexafluoride ($UF_6$) cylinder according to the present invention.

Comparing the recovering device of the present invention, shown in FIG. 3, with the conventional device for treating washing wastewater shown in FIG. 2, the NaDU reactor 1 of the present invention includes three constitutional elements of the conventional device, that is, a first wastewater storage tank (column tank), a second wastewater storage tank (decay tank), and a precipitation reactor. In the present invention, two filter separators 2 and 2' may be provided, thereby improving the quality of the uranium (U) that is recovered.

A better understanding of the present invention may be obtained through the following Examples. It will be obvious to those skilled in the art that the Examples are set forth to illustrate the present invention but are not to be construed to limit the scope of the present invention.

Example 1. Reaction Mechanism During Washing of $UF_6$ Cylinder

(1) Reaction During Washing of $UF_6$ Cylinder $UF_6 + 2H_2O \rightarrow UO_2F_2 + 4HF$ $UF_4 + 2H_2O_2 + Na_2CO_3 \rightarrow UO_2F_2 + 2H_2O + 2NaF + \tfrac{1}{2}O_2\uparrow + CO_2\uparrow$ $Na_2CO_3 + 2HF \rightarrow 2NaF + H_2O + CO_2\uparrow$ Example 2. Reaction Mechanism of Precipitation of Uranium (1) Case where nitric acid ($HNO_3$) is added to the washing solution and ammonia ($NH_3$) is added thereto to precipitate ammonium diuranate (ADU)

$$2UO_2(NO_3)_2 + 3H_2O + 6NH_3 \rightarrow (NH_4)_2U_2O_7 + 4NH_4NO_3 \quad 1)$$

$$HF + NH_3 \rightarrow NH_4F \quad 2)$$

$$HNO_3 + NH_3 \rightarrow NH_4NO_3 \quad 3)$$

(2) Case where Sodium Hydroxide (NaOH) is Added to the Washing Solution to Precipitate Sodium Diuranate (NaDU)

$$2UO_2F_2 + 6NaOH \rightarrow Na_2U_2O_7 + 4NaF + 3H_2O$$

Meanwhile, the composition of the washing solution was analyzed in consideration of the aforementioned reaction mechanisms, and the results are shown in Table 2 below.

TABLE 2

Composition table of washing solution (kg per one cylinder (%))

| Composition | CASE I | CASE II-1 | CASE II-2 | CASE III-1 | CASE III-2 | CASE III-3 | CASE III-4 |
|---|---|---|---|---|---|---|---|
| $H_2O$ | 96.22 (95.53) | 101.844 (90.36) | 96.812 (96.35) | 101.79 (81.4) | 104.313 (90.37) | 103.773 (89.81) | 109.473 (90.06) |
| $Na_2CO_3$ | 3.487 (3.47) | — | 0.307 (0.30) | — | 0.307 (0.27) | 3.487 (3.02) | 3.487 (2.87) |
| $UO_2F_2$ | 0.609 (0.61) | — | 0.609 (0.61) | — | — | — | — |
| $Na_2U_2O_7$ | — | — | — | — | 0.627 (0.54) | 0.627 (0.54) | 0.627 (0.52) |
| $UO_2(NO_3)_2$ | — | 0.779 (0.69) | — | — | — | — | — |
| ADU | — | — | — | 0.617 (0.49) | — | — | — |
| NaF | 0.232 (0.23) | 0.232 (0.21) | 2.752 (2.74) | 0.232 (0.18) | 2.918 (2.53) | 0.398 (0.34) | 6.698 (5.51) |
| NaOH | — | — | — | — | 7.263 (6.29) | 7.263 (6.29) | 1.263 (1.04) |
| HF | — | 0.079 (0.07) | — | — | — | — | — |
| $NH_4F$ | — | — | — | 0.263 (0.21) | — | — | — |
| $NH_4NO_3$ | — | — | — | 16.559 (13.24) | — | — | — |
| $NaNO_3$ | — | 5.592 (4.96) | — | 5.592 (4.47) | — | — | — |
| $HNO_3$ | — | 4.174 (3.70) | — | — | — | — | — |
| Total | 100.55 (100) | 112.7 (100) | 100.428 (100) | 125.054 (100) | 115.428 (100) | 115.548 (100) | 121.548 (100) |

※1. CASE I: Crude liquid immediately after washing
2. CASE II-1: Nitric acid is added to washing crude liquid (based on 10N concentration, 10 L – 15.6 kg)
CASE II-2: Hydrofluoric acid is added to washing crude liquid (based on 50% concentration, 2 L – 2.4 kg)
3. CASE III-1: NH3 is added to CASE II-1 solution (only amount suitable for neutralization is considered)
CASE III-2: 50% NaOH is added to CASE II-2 solution (based on 10 L – 15 kg)
CASE III-3: 50% NaOH is added to CASE I (10 L – 15 kg)
CASE III-4: Hydrofluoric acid is added to CASE III-3 solution (based on 5 L – 6 kg)

4. Decomposition of $Na_2CO_3$ in aqueous solution and removal of $CO_2$ by heating were not considered The following Experimental Examples are provided in order to compare and analyze precipitation tests of ammonium diuranate (ADU) and sodium diuranate (NaDU), performed in the course of developing the process of the present invention, thereby selecting the optimum process. As a result, a sodium diuranate (NaDU) precipitation process was found to be useful in satisfying atomic energy licensing standards and environmental regulation standards. Further, in order to further analyze the result of precipitation of sodium diuranate (NaDU), the precipitation of sodium hydroxide (NaOH) and ammonium fluoride ($NH_4F$) was compared.

Experimental Example 1. Results of Comparative Precipitation Tests of Ammonium Diuranate (ADU)/Sodium Diuranate (NaDU)

TABLE 3

(1) Test for precipitation of calcium fluoride ($CaF_2$) after precipitation of ammonium diuranate (ADU)

| Order | Test process | U (ppm // Bq/cc) | F (ppm) | Note |
|---|---|---|---|---|
| 1st | ADU-precipitation supernatant + slaked lime | 29.3 // 3.2 | 38 | |

TABLE 3-continued (1) Test for precipitation of calcium fluoride ($CaF_2$) after precipitation of ammonium diuranate (ADU)

| Order | Test process | U (ppm // Bq/cc) | F (ppm) | Note |
|---|---|---|---|---|
| 2nd | ADU-precipitation supernatant + slaked lime | 5.40 // 0.6 | 66 | |

* Regulation value: Activity (alpha, beta) <0.08 Bq/cc, fluorine (F) <10 ppm
* ppm is converted into Bq/cc in consideration of specific radioactivity of 5% U-235

TABLE 4

(2) Test for precipitation of sodium fluoride (NaF) after precipitation of sodium diuranate (NaDU)

| Order | Test process | U (Bq/cc) | F (ppm) | Note |
|---|---|---|---|---|
| 1st | NaDU-precipitation supernatant + NH$_4$F | 0.006 | 1 | |
| 2nd | NaDU-precipitation supernatant + NH$_4$F | 0.011 | 1 | |

As seen from the result of the precipitation tests on ammonium diuranate (ADU) and sodium diuranate (NaDU), with respect to the removal of uranium (U), the ammonium diuranate (ADU) treatment is found not to satisfy the regulatory value for the content of uranium (U). The sodium diuranate (NaDU) precipitation reaction is simpler and has a shorter reaction time, compared to the precipitation reaction of ammonium diuranate (ADU), thus ensuring high economic feasibility. Further, with respect to the removal of fluorine (F), since nitric acid (HNO$_3$) and ammonia (NH$_3$) must be used during the treatment of ammonium diuranate (ADU), calcium fluoride (CaF$_2$) is essentially precipitated, and it is difficult to satisfy environmental regulation values governing the content of fluorine (F). However, when a process of precipitating sodium fluoride (NaF) is used, sodium fluoride (NaF) can be treated during the process.

Further, when the precipitation of sodium diuranate (NaDU) and sodium fluoride (NaF) is used, the reagent required during the process (nitric acid (HNO$_3$), ammonia (NH$_3$), or calcium hydroxide (Ca(OH)$_2$)) may be replaced with sodium hydroxide (NaOH) or ammonium fluoride (NH$_4$F), which may be easily handled, thereby removing harmful factors during handling and reducing costs.

Accordingly, it can be seen that when the precipitation of sodium diuranate (NaDU) and sodium fluoride (NaF) is used to treat the washing wastewater of the uranium hexafluoride (UF$_6$) cylinder, there are merits in terms of the convenience of the process, the economic feasibility of the process, and a reduction in secondary waste.

Experimental Example 2. Precipitation Test of Ammonium Diuranate (ADU)

TABLE 5

(1) First test

| Order | Test process | U (ppm) | F (ppm) | Note |
|---|---|---|---|---|
| 1st | Crude liquid (500 cc) + filtration + nitric acid (40 cc) + NH$_3$ | 7.0 | 2,800 | Crude liquid is used after being filtered |
| 2nd | Crude liquid (500 cc) + nitric acid (100 cc) + NH$_3$ | 3.3 | 2,300 | |
| 3rd | Crude liquid (500 cc) + nitric acid (50 cc) + NH$_3$ | 2.2 | 2,500 | |

TABLE 6

(2) Second test

| Order | Test process | U (ppm) | F (ppm) |
|---|---|---|---|
| 1st | Washing crude liquid | 9,272 | 2,800 |
| 2nd | Crude liquid (600 cc) + nitric acid (60 cc) + NH$_3$ | 17.8 | 2,400 |
| 3rd | Crude liquid (500 cc) + nitric acid (50 cc) + NH$_3$ | 1,122 | 2,400 |
| 4th | Supernatant of the third process of the second test + slaked lime | 29.3 | 38 |
| 5th | Supernatant of the second process of the second test + slaked lime | 5.4 | 66 |
| 6th | Supernatant of the third process of the first test | 1,054 | 2,800 |
| 7th | Crude liquid + ( ) 10% | 216 | 2,500 |

The precipitation of ammonium diuranate (ADU) using nitric acid (HNO$_3$) treatment has drawbacks in that the reaction conditions are very sensitive, the reaction time is very long, and fluorine (F) contained in the filtrate cannot be treated. Further, if filtration is not performed immediately after precipitation, uranium (U) is eluted back into a supernatant, thus increasing the concentration of uranium (U).

Experimental Example 3. Sodium Diuranate (NaDU) Precipitation Test

TABLE 7

(1) First test

| Order | Test process | U (ppm) | F (ppm) |
|---|---|---|---|
| 1st | Crude liquid + NaOH + hydrofluoric acid + precipitation | 13.9 | 2,400 |
| 2nd | Crude liquid + heating + NaOH + hydrofluoric acid + precipitation | 2.1 | 2,500 |
| 3rd | Crude liquid + nitric acid + NaOH + hydrofluoric acid + precipitation | 59.4 | 2,500 |

TABLE 8

(2) Second test

| Order | Test process | U (ppm) | F (ppm) | Note |
|---|---|---|---|---|
| 1st | 300 cc of crude liquid→Na$_2$CO$_3$ (19.5 g)→agitation→heating to 74° C.→45 cc of NaOH→coagulant→filtration | 6.1 | 2,500 | Na$_2$CO$_3$ is used before precipitation (heated) |
| 2nd | 300 cc of crude liquid→Na$_2$CO$_3$(19.5 g)→agitation→HF (pH$_4$)→heating to 60° C.→45 cc of NaOH→coagulant→filtration | 17.1 | 10,000 | Na$_2$CO$_3$ is used before precipitation Hydrofluoric acid is added after precipitation (heated) |

TABLE 9

(3) Third test

| Order | Test process | U (ppm) | F (ppm) | Note |
|---|---|---|---|---|
| 1st | 300 cc of crude liquid→heating to 75° C.→45 cc of NaOH→cooling→coagulant→filtration | 10.6 | 1,500 | No hydrofluoric acid is used (heated) |
| 2nd | 300 cc of crude liquid→heating to 75° C.→45 cc of NaOH→40 cc of HF→cooling→coagulant→filtration | 10.1 | 11,200 | Hydrofluoric acid is used after precipitation (heated) |
| 3rd | 300 cc of crude liquid→heating to 75° C.→30 cc of NaOH→cooling→coagulant→filtration | 10.6 | 1,900 | No hydrofluoric acid is used (heated) |
| 4th | 300 cc of crude liquid→heating to 75° C.→30 cc of NaOH→40 cc of HF→cooling→coagulant→filtration | 11.0 | 12,600 | Hydrofluoric acid is used after precipitation (heated) |

※ Special feature: In all four cases, flocculation using Floc is preferably not performed, and the supernatant is not transparent before filtration

TABLE 10

(4) Fourth test

| Order | Test process | U (ppm) | F (ppm) | Note |
|---|---|---|---|---|
| 1st | 300 cc of crude liquid→6 cc of HF→heating to 75° C.→15 cc of NaOH→cooling to 35° C.→coagulant→filtration | 13.9 | 10,500 | Hydrofluoric acid is used before precipitation (heating) |
| 2nd | 300 cc of crude liquid→6 cc of HF→15 cc of NaOH→cooling to 35° C.→coagulant→filtration | 22.8 | 11,200 | Hydrofluoric acid is used before precipitation (unheated) |

※ Special feature: In both cases, flocculation using Floc is preferably performed

TABLE 11

(5) Fifth test

| Order | Test process | U (ppm) | F (ppm) | Note |
|---|---|---|---|---|
| 1st | 300 cc of crude liquid→9 cc of NH₄F→heating to 75° C.→15 cc of NaOH→cooling→coagulant→filtration | 25.2 | 11,100 | NH₄F is used before precipitation (heated) |
| 2nd | 300 cc of crude liquid→9 cc of NH₄F→15 cc of NaOH→cooling→coagulant→filtration | 4.3 | 14,500 | NH₄F is used before precipitation (unheated) |

※ Special feature: In all four cases, flocculation using Floc is preferably performed, but the supernatant is not transparent before filtration

TABLE 12

(6) Sixth test

| Order | Test process | U (ppm) | F (ppm) | Note |
|---|---|---|---|---|
| 1st | 300 cc of crude liquid→heating to 75° C.→15 cc of NaOH→cooling→coagulant→filtration | 9.1 | 1,900 | No hydrofluoric acid is used (heated) |
| 2nd | Ditto | 13.4 | 1,800 | Ditto |

※ Special feature: In all four cases, flocculation using Floc is preferably not performed, and the supernatant is not transparent before filtration Experimental Example 4. Precipitation Test of Fluorine (F)

TABLE 13

(1) Precipitation test of calcium fluoride (CaF2) after precipitation of ammonium diuranate (ADU)

| Order | Test process | U (ppm // Bq/cc) | F (ppm) |
|---|---|---|---|
| 1st | ADU-precipitation supernatant + slaked lime | 29.3 // 3.2 | 38 |
| 2nd | ADU-precipitation supernatant + slaked lime | 5.40 // 0.6 | 66 |

※ Regulation value: Activity (alpha, beta)<0.08 Bq/cc, fluorine (F)<10 ppm

※ ppm is converted into Bq/cc in consideration of specific radioactivity of 5% U-235

TABLE 14

(2) Precipitation test of sodium fluoride (NaF) after precipitation of sodium diuranate (NaDU)

| Order | Test process | U (Bq/cc) | F (ppm) |
|---|---|---|---|
| 1st | NaDU-precipitation supernatant + NH₄F | 0.006 | 1 |
| 2nd | NaDU-precipitation supernatant + NH₄F | 0.011 | 1 |

1) Test type: After a cylinder wastewater (nitric acid (HNO₃) was not added) was treated using a compound including uranium (U), sodium (Na), and fluorine (F) to perform precipitation, the supernatant was subjected to simple distillation to precipitate sodium fluoride (NaF), followed by sampling 2) Procedure: 300 ml of the wastewater→15 g of sodium hydroxide (NaOH) was added→filtration→250 ml of the filtrate+ammonium fluoride (NH₄F) (80 ml)→the filtrate was subjected to simple distillation, followed by sampling→analysis of fluorine (F) and activity Experimental Example 5

Experiment in device for recovering uranium (U) using a process for treating washing wastewater released during a process of washing a uranium hexafluoride (UF$_6$) cylinder according to the present invention (1) First Experiment
1) Experimental Condition
(a) 30 kg of cylinder washing wastewater+1.5 kg of NaOH (aq, 30%)
(b) NaOH addition speed: 300 g/min
(c) Reaction time: 30 min
(d) Reaction temperature: 40 to 60° C.
(e) Reaction pressure: 0 bar·G
(f) Evaporation temperature: 110 to 130° C.
2) Object
(a) Measurement of the amounts of uranium (U) and fluorine (F) in each step under experimental conditions

TABLE 15

| | | | | |
|---|---|---|---|---|
| | | | | Atomic energy licensing standards and environmental regulation standards |
| Classification | Sample | U content | F content | |
| 1 | Cylinder washing wastewater | 0.60% | 2,557 ppm | — |
| 2 | NaDU filtrate | 11 ppm | 5,613 ppm | Satisfied |
| 3 | NaDU cake | 15.30% | 4,603 ppm | — |
| 4 | Condensate | 0.8 ppm | 4 ppm | Satisfied |

4) Others
(a) Specific gravity of cylinder washing wastewater: 1.028

(2) Second Experiment
1) Experimental Conditions
(a) 20 kg of cylinder washing wastewater+1 kg of NaOH (aq, 30%)
(b) NaOH addition speed: 2 kg/min
(c) Reaction time: 30 min
(d) Reaction temperature: 40 to 60° C.
(e) Reaction pressure: 0 bar·G
(f) Evaporation temperature: 110 to 130° C.
2) Object
(a) Comparison of changes in the amounts of uranium (U) and fluorine (F) depending on the addition speed of sodium hydroxide (NaOH)
(b) Comparison of the first and second experiments after the amounts of washing wastewater and sodium hydroxide (NaOH) that were added in the first experiment are each reduced by ⅓ in order to reduce the amount of wastewater released during the experiment

TABLE 16

| | | | | |
|---|---|---|---|---|
| | | | | Atomic energy licensing standards and environmental regulation standards |
| Classification | Sample | U content | F content | |
| 1 | Filtrate of cylinder washing wastewater | 0.32% | 1,507 ppm | — |
| 2 | NaDU filtrate | 11 ppm | 4,608 ppm | Satisfied |
| 3 | NaDU cake | 52.80% | 2,665 ppm | — |
| 4 | Condensate | 0.1 ppm (0.05 Bq/cc) | 1 ppm | Satisfied |

(3) Third Experiment
1) Experimental Conditions
(a) 20 kg of cylinder washing wastewater+2 kg of NaOH (aq, 30%)
(b) NaOH addition speed: 2 kg/min
(c) Reaction time: 30 min
(d) Reaction temperature: 40 to 60° C.
(e) Reaction pressure: 0 bar·G
(f) Settling (30 min) and bottom solution drain (1 Liter)
(g) Evaporation temperature: 110 to 130° C.
2) Object
(a) Comparison of the amount of the radioactivity of the condensate when the addition amount of sodium hydroxide (NaOH) is increased, with that of other experiments

TABLE 17

| Classification | Sample | Amount of radioactivity (Bq/cc) | Atomic energy licensing standards and environmental regulation standards |
|---|---|---|---|
| 1 | Filtrate of cylinder washing wastewater | 189.600 | — |
| 2 | NaDU filtrate | 0.425 | Satisfied |
| 3 | Condensate | N.D* (<0.03) | Satisfied |

*Non-detected (4) Fourth Experiment
1) Experimental Conditions
(a) 20 kg of cylinder washing wastewater+2 kg of NaOH (aq, 30%)
(b) NaOH addition speed: 2 kg/min
(c) Reaction time: 30 min
(d) Reaction temperature: 40 to 60° C.
(e) Reaction pressure: 2.5 bar·G
(f) Settling (30 min) and bottom solution drain (1 Liter)
(g) Evaporation temperature: 110 to 130° C.
2) Object
(a) Comparison of the amount of the radioactivity of the condensate when the reaction pressure is increased as high as possible with that of other experiments

TABLE 18

| Classification | Sample | Amount of radioactivity (Bq/cc) | Atomic energy licensing standards and environmental regulation standards |
|---|---|---|---|
| 1 | Condensate (30 min after evaporation) | 0.0224 | Satisfied |
| 2 | Condensate (60 min after evaporation) | 0.0145 | Satisfied |

(5) Fifth Experiment
1) Experimental Conditions
(a) 20 kg of cylinder washing wastewater+2 kg of NaOH (aq, 30%)
(b) NaOH addition speed: 2 kg/min
(c) Reaction time: 30 min
(d) Reaction temperature: 40 to 60° C.
(e) Reaction pressure: 0 bar·G
(f) Settling (30 min) and bottom solution drain (1 Liter)
(g) Evaporation temperature: 110 to 130° C.
2) Object
(a) Comparison of the amount of the radioactivity of the condensate when a sodium diuranate (NaDU) solution is filtered, followed by evaporation of a filtrate, with that of other experiments

TABLE 19

3) Experimental result

| Classification | Sample | Amount of radioactivity (Bq/cc) | Atomic energy licensing standards and environmental regulation standards |
|---|---|---|---|
| 1 | Condensate (30 min after evaporation) | 0.0195 | Satisfied |
| 2 | Condensate (60 min after evaporation) | 0.0055 | Satisfied |
| 3 | Condensate (evaporation of NaDU filtrate) | 0.0466 | Satisfied |

(6) Sixth Experiment
1) Experimental Conditions
(a) 20 kg of cylinder washing wastewater+1.5 kg of NaOH (aq, 30%)
(b) NaOH addition speed: 2 kg/min
(c) Reaction time: 30 min
(d) Reaction temperature: 40 to 60° C.
(e) Reaction pressure: 0 bar·G
(f) Settling (30 min) and bottom solution drain (1 Liter)
(g) Evaporation temperature: 110 to 130° C.
2) Object
(a) Comparison of the amount of the radioactivity of the condensate when the amount of sodium hydroxide (NaOH) that is added is reduced with that of other experiments
3) Experimental Result

TABLE 20

| Classification | Sample | Amount of radioactivity (Bq/cc) | Atomic energy licensing standards and environmental regulation standards |
|---|---|---|---|
| 1 | Condensate (30 min after evaporation) | 0.0135 | Satisfied |
| 2 | Condensate (60 min after evaporation) | 0.0322 | Satisfied |

Figure 4:
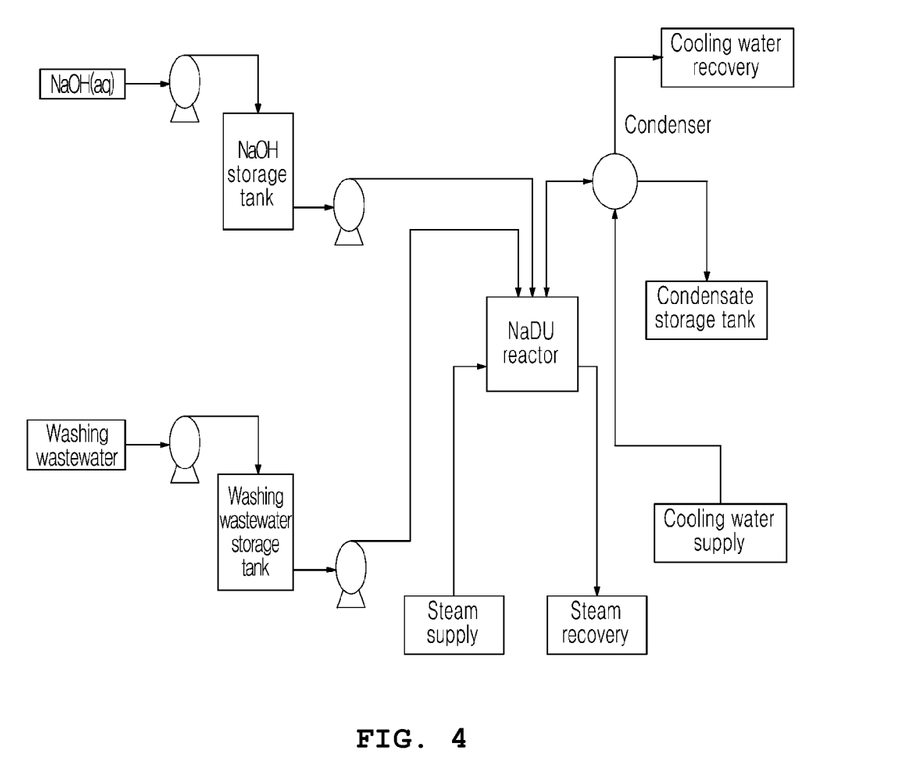
FIG. 4 schematically shows the experimental apparatus of 5 in Experimental Examples 1 to 5.

Experimental Examples 1 to 4 of the present invention provide data on experiments performed in order to improve the conventional process for treating washing wastewater. Experimental Example 5 is an experiment for confirming whether or not the process of the present invention satisfies atomic energy licensing standards and environmental regulation standards. FIG. 4 schematically shows an experimental apparatus.

In the present experiments, the addition amount and the addition speed of sodium hydroxide (NaOH), the reaction temperature and time, and the pH were selected as variables, and the results depending on the variables were compared to each other. As for atomic energy licensing standards and environmental regulation standards, the sodium diuranate (NaDU) filtrate can be transported from a radiation-controlled area to a non-controlled area when the content of uranium (U) is 20 ppm or less, and accordingly, the sodium diuranate filtrate may be transported to a chemical treatment factory. The condensate can be released to the environment when the concentration of uranium (U) is 1 ppm or less (<0.08 Bq/cc) and the concentration of fluorine (F) is 10 ppm or less. Experiments were performed while the variables were changed in order to confirm the regions in which the atomic energy licensing standards and environmental regulation standards were or were not satisfied. All experimental results satisfied atomic energy licensing standards and environmental regulation standards. Appropriate reaction conditions may be selected according to the situation for operation of a commercial apparatus according to the present invention.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

Accordingly, the actual scope of the present invention will be defined by the appended claims and equivalents thereof.

The invention claimed is:

1. A method of recovering uranium (U) using a process for treating a washing wastewater comprising hydrogen peroxide ($H_2O_2$), sodium carbonate ($Na_2CO_3$), and a uranium complex, the washing wastewater released during a washing process of a uranium hexafluoride ($UF_6$) cylinder, the method comprising:
   (1) adding sodium hydroxide (NaOH) to the washing wastewater to precipitate the uranium complex, contained in the washing wastewater, in a sodium diuranate (NaDU) form;
   (2) separating a sodium diuranate (NaDU) precipitate formed during the step (1) and the washing wastewater using filtration;
   (3) evaporating the washing wastewater filtered during the step (2); and
   (4) cooling a vapor generated during the step (3) to recover a condensate and then checking remaining amounts of uranium (U) and fluorine (F).

2. The method of claim 1, wherein a demineralized water or a mixed solution, including the hydrogen peroxide ($H_2O_2$) and the sodium carbonate-($Na_2CO_3$), is used as a washing solution during the washing process of the uranium hexafluoride ($UF_6$) cylinder, causing generation of the washing wastewater.

3. The method of claim 1, further comprising:
   after the step (3),
   (5) filtering and evaporating a remaining wastewater after the evaporating of the step (3); and
   (6) cooling a vapor generated during the step (5) to recover a condensate and then checking remaining amounts of uranium (U) and fluorine (F).

4. The method of claim 1, wherein a sodium hydroxide (NaOH) aqueous solution is added while the washing wastewater is heated during the step (1) so that a pH is controlled to form a sodium diuranate (NaDU) solid, thereby performing precipitation.

5. The method of claim 1, wherein during the step (3), a steam is supplied to evaporate water, the evaporated water is transported through a heat exchanger to a condensate storage tank, and a residue is returned to the step (2).

* * * * *